No. 782,710. PATENTED FEB. 14, 1905.
C. WELLER.
DRINKING GLASS OR LIKE TABLEWARE.
APPLICATION FILED NOV. 18, 1903.
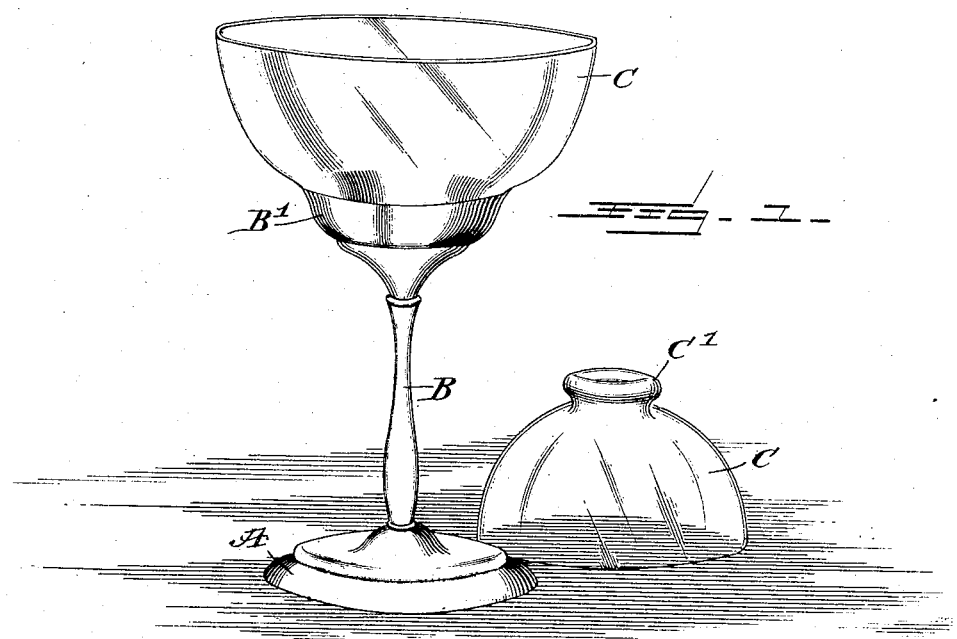
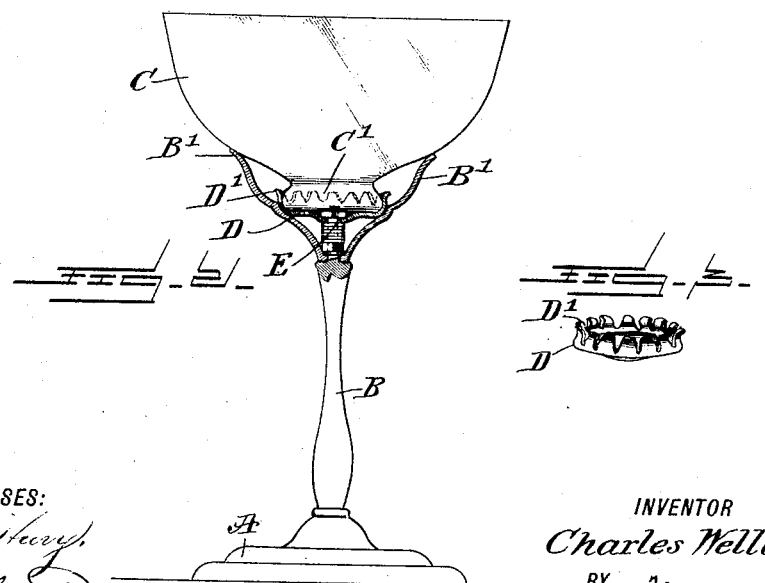
WITNESSES:
INVENTOR
Charles Weller
BY
ATTORNEYS No. 782,710.                                              Patented February 14, 1905.

UNITED STATES PATENT OFFICE.

CHARLES WELLER, OF NEWARK, NEW JERSEY.

DRINKING-GLASS OR LIKE TABLEWARE.

SPECIFICATION forming part of Letters Patent No. 782,710, dated February 14, 1905.

Application filed November 18, 1903. Serial No. 181,626.

*To all whom it may concern:*

Be it known that I, CHARLES WELLER, a citizen of the United States, and a resident of Newark, in the county of Essex and State of New Jersey, have invented a new and Improved Drinking-Glass or Like Tableware, of which the following is a full, clear, and exact description.

The invention relates to glassware; and its object is to provide a new and improved drinking-glass arranged to allow of using interchangeable bowls of different sizes and shapes on the same stem and base.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is a side elevation of the same, parts being in section; and Fig. 3 is a perspective view of the retainer for removably holding the bowl in position on the stem.

The drinking-glass illustrated in the drawings consists, essentially, of a base A, a stem B rising from the base, and a separable cup or bowl C, removably held on a retainer D, carried on the upper end of the stem B. The cup or bowl is preferably made of glass or other similar fragile material, while the remaining parts—that is, the base A, the stem B, and the retainer D—are preferably made of metal to provide a substantial non-breakable support for the fragile bowl or cup, so that in case a cup breaks a new cup can be readily used on the same stem and base. If it is desired to use a different-shaped cup than the one in position on the stem, the cup on the stem can be readily removed and replaced by the one of different size and shape.

As shown, each interchangeable bowl or cup C is provided at its bottom with a depending necked annular projection C', adapted to be engaged at the neck by the spring-fingers D' of the retainer D, on which rests the flat bottom of the projection C', as plainly indicated in Fig. 2. The spring-fingers D' are arranged in a circle and readily spring temporarily outward on pressing the projection C' downward against the fingers for the projection to pass the spring-fingers and for the latter to spring back and engage the neck of the projection as soon as the base of the projection has passed the spring-fingers and engages the bottom of the retainer D. In a like manner, when it is desired to remove the cup C, an outward pull on the cup disengages the projection C' from the spring-fingers D', to permit of placing another cup in position on the retainer.

The stem B is preferably provided at its upper end with a socket B', which incloses the retainer D and extends a distance above the same to engage the side of the bowl or cup to insure a very firm seating of the bowl on the upper end of the stem, as the bowl is engaged at the projection C' by the retainer D and at its sides by the socket B'. The retainer D is fastened by a screw E or other suitable fastening means to the stem B, as indicated in Fig. 2; but such fastening of the retainer can be varied without deviating from the spirit of my invention.

Having thus described my invention, I claim as new and desire to secure by Letters Patent—

1. A drinking-glass or like tableware, comprising a base, a stem rising from the base and having a reduced and screw-threaded upper end, a flaring socket having a tapering lower end, said end having an opening in its bottom and resting upon the shoulder formed by the reduced end of the stem with the reduced and threaded upper end of the stem projecting into the same, a disk-like retainer in the socket above the bottom thereof, said retainer being provided with a central depression, an aperture in said depression to receive the threaded end of the stem, and with upwardly-projecting spring-fingers at its margin, a nut on the threaded end of the stem within the depression of the retainer and securing the socket and retainer to the stem, and a cup or bowl provided on its bottom with a neck-like projection having a substantially flat lower face, said projection resting upon the body of the retainer and engaged at its margin by the fingers thereof, the side of the cup or bowl being engaged by the socket, as set forth.

2. A drinking-glass or like tableware, comprising a base, a stem rising from the base, a flaring socket on the upper end of the stem, a disk-like retainer in the socket and having upwardly-projecting spring-fingers at its margin, a screw-securing socket on the stem and the retainer in the said socket below the upper edge thereof, and a cup or bowl provided on its bottom with a neck-like projection having a substantially flat lower face, said projection resting upon the body of the retainer and engaged at its margin by the fingers thereof, the side of the cup or bowl being engaged by the socket, as set forth.

3. A drinking-glass or like tableware, comprising a base, a stem rising from the base and having a flaring socket at its upper end, a disk-like retainer having upwardly-projecting spring-fingers at its margin, said retainer being secured in and resting upon the inner surface of the socket below the upper edge thereof, and a cup or bowl having a necked projection on its bottom, said projection having a substantially flat lower face resting upon the retainer and engaged at its margin by the fingers thereof, the side of the cup or bowl being engaged by the socket, as set forth.

4. A support for a drinking-glass or the like, consisting of a base, a stem rising from the base and having a reduced and threaded upper end, a flaring socket having a tapering lower end, said end having an opening in its bottom through which the reduced and threaded end of the stem projects, the socket resting upon the shoulder formed by the reduced end of the said stem, a disk-like retainer having an opening in its bottom and spring-fingers at its margin, said retainer being secured within the socket below its upper edge with the reduced end of the stem extending through the opening thereof, and a nut on the said threaded end of the stem and securing the retainer in the socket and the socket on the stem, as set forth.

In testimony whereof I have signed my name to this specification in the presence of two subscribing witnesses.

CHARLES WELLER.

Witnesses:
F. C. STANDINGER,
N. GAGLIOTTI.